US011081779B2

(12) United States Patent
Nishioka

(10) Patent No.: US 11,081,779 B2
(45) Date of Patent: Aug. 3, 2021

(54) ELECTRONIC DEVICE HAVING AN ANTENNA

(71) Applicant: LENOVO (SINGAPORE) PTE. LTD., Singapore (SG)

(72) Inventor: Yoshio Nishioka, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 78 days.

(21) Appl. No.: 16/554,807

(22) Filed: Aug. 29, 2019

(65) Prior Publication Data

US 2020/0076050 A1 Mar. 5, 2020

(30) Foreign Application Priority Data

Aug. 30, 2018 (JP) .............................. JP2018-161186

(51) Int. Cl.
| | | |
|---|---|---|
| *H01Q 9/04* | (2006.01) | |
| *H01Q 1/22* | (2006.01) | |
| *G06F 1/16* | (2006.01) | |
| *H01Q 1/24* | (2006.01) | |

(52) U.S. Cl.
CPC ......... *H01Q 1/2266* (2013.01); *G06F 1/1616* (2013.01); *H01Q 1/243* (2013.01); *H01Q 9/04* (2013.01)

(58) Field of Classification Search
CPC .... H01Q 1/2258; H01Q 1/2266; H01Q 1/243; H01Q 1/242; H01Q 1/521; H01Q 9/04; H01Q 9/30; H01Q 19/28; H01Q 21/28; H01Q 9/0485; H01Q 5/378; H01Q 5/385; H04B 1/18; H04B 1/3833; G06F 1/1616; G06F 1/1698

See application file for complete search history.

(56) References Cited

U.S. PATENT DOCUMENTS

| | | | | |
|---|---|---|---|---|
| 7,042,418 B2* | 5/2006 | Fujimura | ............... | H01Q 1/243 |
| | | | | 343/700 MS |
| 7,852,272 B2* | 12/2010 | Imano | .................. | H01Q 9/0421 |
| | | | | 343/702 |
| 8,384,600 B2* | 2/2013 | Huang | ..................... | H01Q 9/30 |
| | | | | 343/700 MS |
| 8,417,296 B2* | 4/2013 | Caballero | ............ | H04B 1/3838 |
| | | | | 455/566 |
| 8,493,274 B2* | 7/2013 | Raura | .................. | H01Q 21/064 |
| | | | | 343/767 |
| 9,184,509 B2* | 11/2015 | Baba | ...................... | H01Q 1/245 |
| 9,960,478 B2* | 5/2018 | Anguera Pros | ........ | H01Q 21/30 |

(Continued)

FOREIGN PATENT DOCUMENTS

| | | |
|---|---|---|
| JP | 10313205 A | 11/1998 |
| JP | 2005295002 A | 10/2005 |

(Continued)

*Primary Examiner* — Haissa Philogene
(74) *Attorney, Agent, or Firm* — Antony P. Ng; Russell Ng PLLC

(57) ABSTRACT

An electronic apparatus capable of reducing specific absorption rate (SAR) is disclosed. The antenna device includes an antenna element to which power is supplied, and at least one resonant antenna element which is disposed such that the longitudinal direction thereof and the longitudinal direction of the antenna element are substantially parallel to each other and which can resonate with the antenna element.

10 Claims, 3 Drawing Sheets

(56) References Cited

U.S. PATENT DOCUMENTS

| | | | | |
|---|---|---|---|---|
| 10,108,224 | B2* | 10/2018 | Tsubaki | G06F 1/1616 |
| 10,133,462 | B2* | 11/2018 | Nishioka | G06F 3/14 |
| 10,630,330 | B2* | 4/2020 | Nishikawa | H01Q 5/371 |

FOREIGN PATENT DOCUMENTS

| | | |
|---|---|---|
| JP | 2009212662 A | 9/2009 |
| JP | 2015-114718 A | 6/2015 |

* cited by examiner (a) Prior Art (b)

ELECTRONIC DEVICE HAVING AN ANTENNA

PRIORITY CLAIM

The present application claims benefit of priority under 35 U.S.C. §§ 120, 365 to the previously filed Japanese Patent Application No. JP2018-161186 with a priority date of Aug. 30, 2018, which is incorporated by reference herein.

TECHNICAL FIELD

The present invention relates to electronic devices in general, and in particular to an electronic device that can reduce a specific absorption rate.

BACKGROUND

In view of the widespread use of wireless communication devices, such as cellular phones and information processing devices, which are used near human bodies, many countries have established standards for permissible specific absorption rate (SAR) values, which are the indexes of the amount of power from radio waves absorbed by human bodies. The SAR means the amount of energy absorbed per unit time by human tissue of unit mass. A higher frequency exhibits a greater influence (a higher absorption rate) on a human body.

Restrictions on the SAR are strict for certain types of portable information devices, such as a notebook type personal computer (laptop PC) and a tablet type personal computer (tablet PC). For example, when a laptop PC or a tablet PC is used on user's laps, the chassis in which antenna devices of the PC are mounted may come in contact with or be close to the knees, the abdomen or the like of the user.

In such a case, if the transmission power of the antenna devices is reduced in consideration of the influences of the SAR on the human body or if the transmission by the antenna devices is interrupted when the human body is detected, then the performance of communication is affected. Further, if the chassis construction of the electronic apparatus is changed to allow a distance between the antenna devices and the human body, then the size of the chassis will inevitably be increased.

Consequently, it would be desirable to provide an improved electronic apparatus having a reduced SAR.

SUMMARY

In accordance with an embodiment of the present disclosure, an antenna device includes an antenna element to which power is supplied; and at least one resonant antenna element that is disposed such that a longitudinal direction thereof and a longitudinal direction of the antenna element are substantially parallel to each other and which is configured to resonate with the antenna element.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

I. Overview of an Electronic Apparatus

Figure 1:
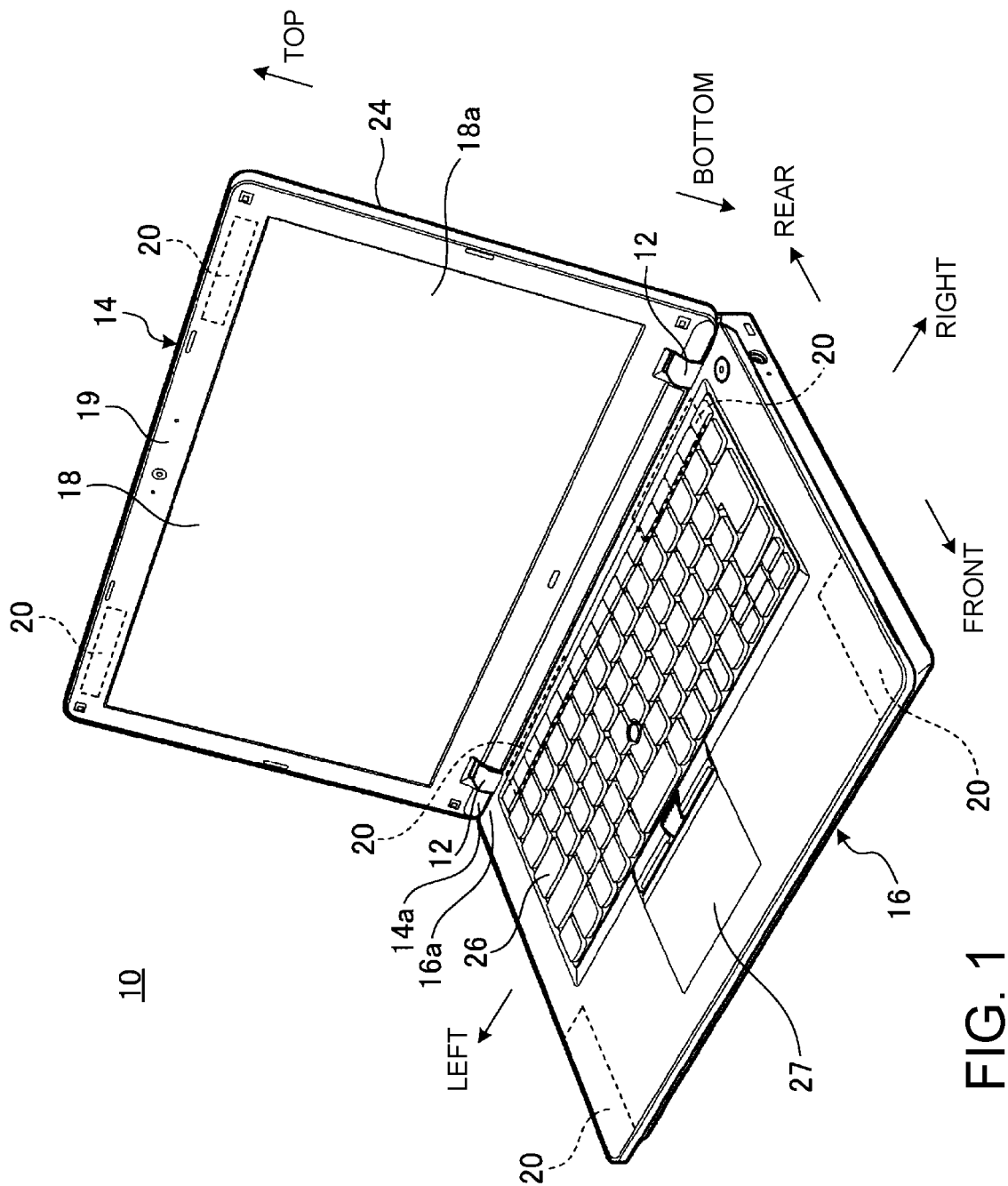
FIG. 1 is a perspective view of an electronic apparatus provided with antenna devices according to one embodiment.

FIG. 1 is a perspective view of an electronic apparatus 10 provided with antenna devices 20 according to an embodiment of the present invention. FIG. 1 illustrates the electronic apparatus 10 being used in a laptop PC mode, in which a display chassis 14 has been opened from a main body chassis 16 by hinge units 12.

The electronic apparatus 10 is a so-called convertible PC configured to be openable/closable from a zero-degree position, at which the display chassis 14 is closed with respect to the main body chassis 16, to a 360-degree position reached by reversing the display chassis 14 from the zero-degree position. Therefore, the electronic apparatus 10 can be ideally used as a laptop PC in the state in which the display chassis 14 has been pivoted to an angular position of approximately 90 degrees with respect to the main body chassis 16 (refer to FIG. 1), and can be also ideally used as a tablet PC in the state in which the display chassis 14 has been reversed with respect to the main body chassis 16 by pivoting the display chassis 14 to the 360-degree position. The present embodiment can be applied to a variety of types of electronic apparatuses, such as a general laptop PC, in which the display chassis thereof can be pivoted only to an approximately 180-degree position, a tablet PC, in which a display device is provided in one chassis, a cellular phone, a smartphone, and an electronic organizer, in addition to the convertible PC described above.

In the following description, the laptop PC usage mode, in which the display chassis 14 has been opened by approximately 90 degrees from the main body chassis 16 as illustrated in FIG. 1, is defined as the reference mode. The hinge unit 12 side of the display chassis 14 will be referred to as the bottom (the lower end), and the opposite side therefrom will be referred to as the top (the upper end). Further, the hinge unit 12 side of the main body chassis 16 will be referred to as the rear (the rear end) and the opposite side therefrom will be referred to as the front (the front end). The width directions of the display chassis 14 and the main body chassis 16 will be referred to as the left and the right.

Referring to FIG. 1, in the electronic apparatus 10, a lower end portion 14a of the display chassis 14 and a rear end portion 16a of the main body chassis 16 are pivotably connected by a pair of left and right hinge units 12.

A display device 18 is provided on the inner surface of the display chassis 14. The display chassis 14 is configured to be a plane-like box body, which is thinner than the main body chassis 16, by overlapping and connecting a bezel member 19 and a cover member 24.

The display device 18 is constituted of, for example, a touch panel liquid crystal display device. The display device 18 is covered by a metal or conductive film, except for a display surface 18a.

The bezel member 19 is a resin frame-like member. The bezel member 19 surrounds the peripheral edge portion of the display device 18 to retain the display device 18. The cover member 24 is composed of a resin plate-like member and configured to have a wall portion which is provided on the peripheral edge portion of the plate-like member and which rises on the bezel member 19 side. The cover member 24 is adapted to cover the side surfaces and the rear surface of the display chassis 14. The display chassis 14 is connected to the main body chassis 16 through the hinge units 12 fixed by screws to the cover member 24. The display chassis 14 is electrically connected to the main body chassis 16 by a cable (not illustrated) which passes through the hinge units 12.

The main body chassis 16 is a box body shaped like a flat plate, and provided with a keyboard device 26 and a touchpad 27 on the inner surface thereof. The main body chassis 16 accommodates therein various electronic components, such as circuit boards, arithmetic units and memories, which are not illustrated. The keyboard device 26 may be, for example, a software keyboard which displays a virtual keyboard on a touch panel liquid crystal display device.

A pair of left and right antenna devices 20 is provided inside the main body chassis 16 at the front of the right end portion and the front of the left end portion. In addition, another pair of left and right antenna devices 20 is provided at the rear end portions of the main body chassis 16. The antenna devices 20 are, for example, antennas for various types of wireless communication, such as wireless LAN or wireless WAN of the electronic apparatus 10. The antenna devices 20 may alternatively be provided in, for example, the bezel member 19 at the upper end of the display chassis 14, as illustrated in FIG. 1. The antenna devices 20 are disposed at the positions where the human body, including hands, can easily touch while using the electronic apparatus 10.

II. Concept of the Antenna Devices

Figure 2:
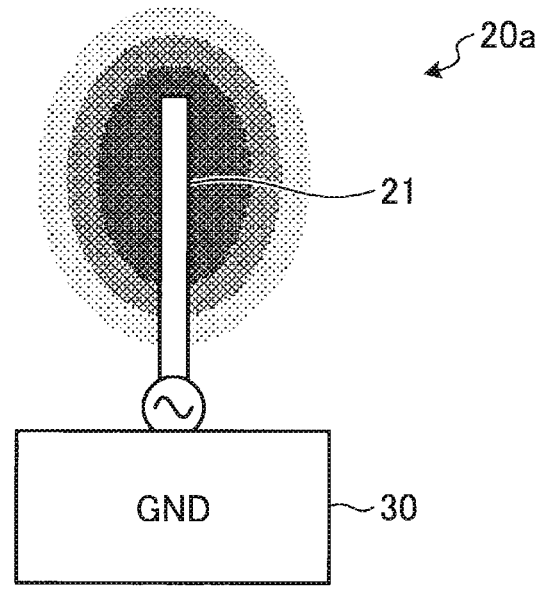
FIG. 2 illustrates the concept of the antenna device.
Figure 2:
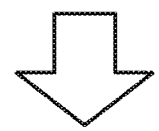
Figure 2:
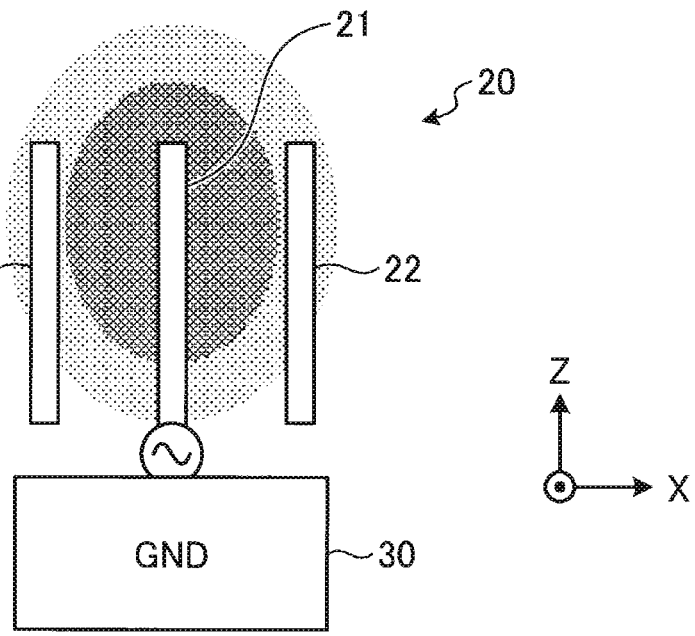

FIG. 2 presents the explanatory drawings illustrating the concept of the antenna devices 20. With reference to FIG. 2, a description will be given of a monopole antenna as an example of the antenna devices 20. Referring to FIG. 2(a), a conventional antenna device 20a has an antenna element 21 installed on a ground 30 to transmit and receive electromagnetic waves by power reception and feeding from and to the antenna element 21. In the case of the transmission from the antenna element 21, electromagnetic waves are transmitted from the antenna element 21. In this case, high radiation power is generated in the vicinity of the antenna element 21.

In contrast to the above, according to the antenna devices 20 of the present embodiment, parasitic resonant antenna elements 22 are disposed in parallel, sandwiching the antenna element 21 along the direction (X direction) perpendicular to the longitudinal direction (Z direction) of the antenna element 21, as illustrated in FIG. 2(b). The resonant antenna elements 22 resonate in a spatially coupled manner in response to the resonance of the antenna element 21, thereby transmitting electromagnetic waves. As a result, the radiation power of the antenna element 21 is dispersed to the resonant antenna elements 22, and the electromagnetic waves are transmitted from the whole spatially expanded area of the antenna element 21 and the resonant antenna elements 22. With this arrangement, the proximity electromagnetic field emitted from the antenna element 21 is suppressed, thus enabling a local SAR to have a predetermined value or less without the need for reducing the transmission power.

The intensities of distant electromagnetic fields of the antenna device 20 and the antenna device 20a are approximately the same, although there is a difference therebetween by the loss of coupling between the antenna element 21 and the resonant antenna elements 22, thus causing no significant difference in antenna performance.

III. Specific Example of Antenna Devices 20

Figure 3:
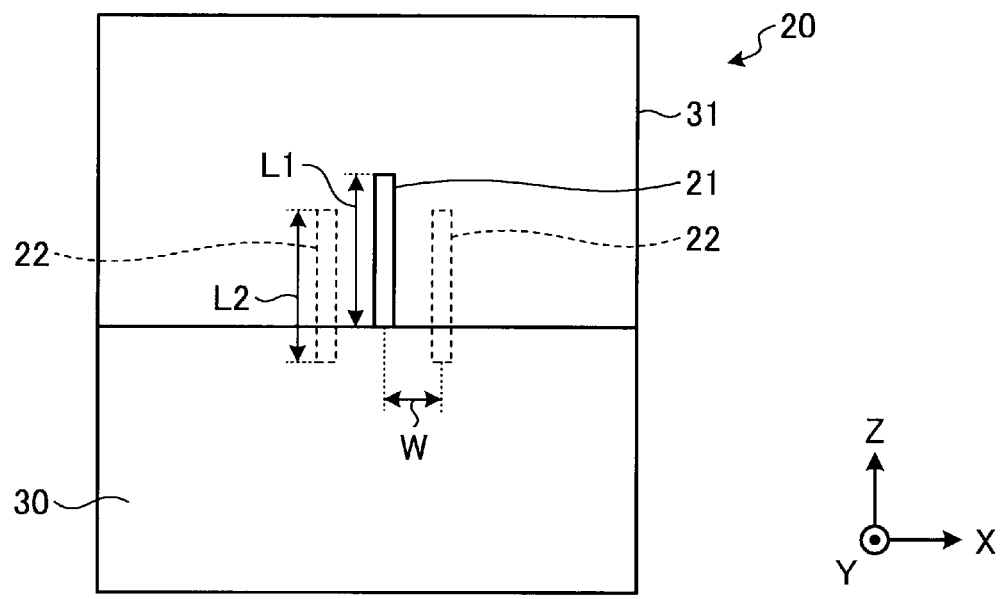
FIG. 3 is a diagram illustrating the configuration of the antenna device.

FIG. 3 is a diagram illustrating the specific configuration of each of the antenna devices 20. Referring to FIG. 3, in the antenna device 20, a ground 30 and an antenna element 21 are printed on the front surface (the surface in a +Y direction) of a printed circuit board 31, and parasitic resonant antenna elements 22, which are disposed in parallel with respect to the antenna element 21, are printed on the rear surface (the surface in a ?Y direction) of the printed circuit board 31.

In FIG. 3, two resonant antenna elements 22 are formed, and the resonant antenna elements 22 are disposed symmetrically with respect to the axis in the longitudinal direction (the Z direction) of the antenna element 21. A length L2 of each of the resonant antenna elements 22 is substantially the same as a length L1 of the antenna element 21. However, the resonant antenna elements 22 are parasitic elements, so that the length L2 of each of the resonant antenna elements 22 is set to be different from the length L1 of the antenna element 21, taking resonance conditions into account.

A width W between the resonant antenna elements 22 and the antenna element 21 is set according to the resonance conditions.

Further, the resonant antenna elements 22 are disposed with the centers thereof in the longitudinal direction (the Z direction) staggered in the longitudinal direction (the Z direction) with respect to the center in the longitudinal direction (the Z direction) of the antenna element 21 to disperse the concentration of the transmission power of the antenna element 21 also in the Z direction. The resonant antenna elements 22 illustrated in FIG. 3 are disposed, being staggered in the ?Z direction with respect to the antenna element 21.

Figure 4:
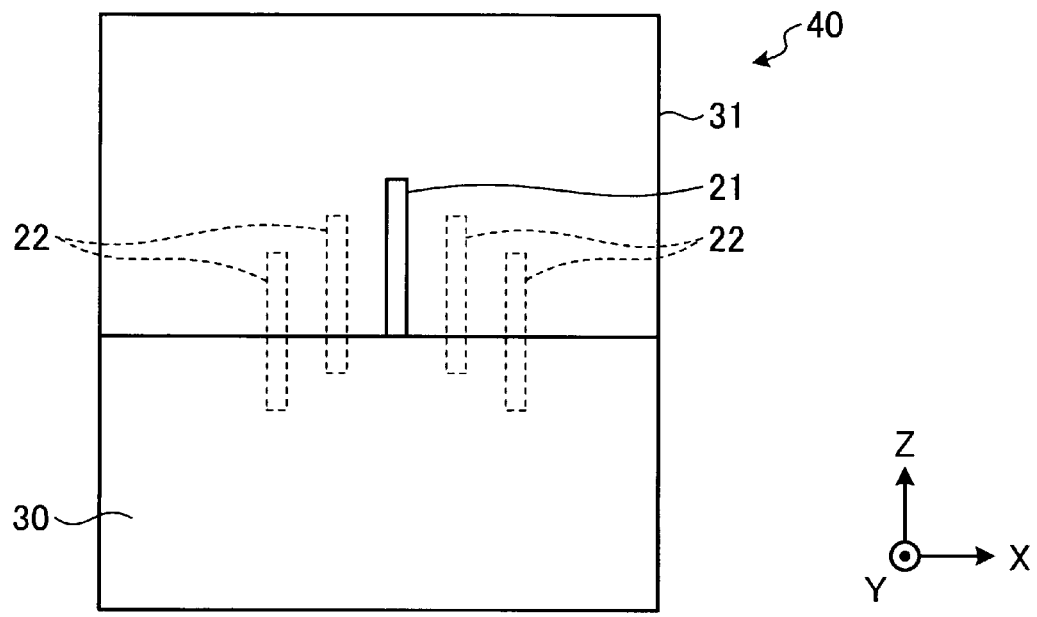
FIG. 4 is a diagram illustrating an antenna device constituted by adding resonant antenna elements to the antenna device illustrated in FIG. 3.

FIG. 4 is a diagram illustrating the configuration of an antenna device 40 constructed by adding more resonant antenna elements 22 to the antenna device 20 illustrated in FIG. 3. Referring to FIG. 4, the antenna device 40 has additional resonant antenna elements 22 on the outer side (?X directions) of the resonant antenna elements 22 on the rear surface of a printed circuit board 31. The additional resonant antenna elements 22 are disposed with the centers thereof in the longitudinal direction (the Z direction) being further staggered in the longitudinal direction (the ?Z direction) with respect to the center in the longitudinal direction (the Z direction) of the antenna element 21. The antenna device 40 can further disperse the concentration of the transmission power of the antenna element 21, as compared with the antenna device 20.

Each of the resonant antenna elements 22 may have lengths of integral multiples insofar as the resonant antenna elements 22 resonate. Further, at least one resonant antenna element 22 is to be provided. This is because placing even one resonant antenna element 22 makes it possible to disperse the concentration of the transmission power of the antenna element 21. In other words, the resonant antenna elements 22 do not have to be disposed symmetrically with respect to the axis of the antenna element 21 in the longitudinal direction (the Z direction). Further, the resonant antenna elements 22 do not have to have the centers thereof in the longitudinal direction (the Z direction) staggered in the longitudinal direction (the Z direction) with respect to the center in the longitudinal direction (the Z direction) of the antenna element 21.

In the foregoing embodiment, the monopole antenna has been described as the example; however, the present invention is not limited thereto, and can be applied also to various types of antenna devices. The present invention is usefully applied especially to linear antennas.

As has been described, the present invention provides an improved electronic apparatus having a reduced SAR.

While the invention has been particularly shown and described with reference to a preferred embodiment, it will be understood by those skilled in the art that various changes in form and detail may be made therein without departing from the spirit and scope of the invention.

What is claimed is:

1. An antenna device, comprising:
   an antenna element to which power is supplied;
   a first resonant antenna element that is disposed such that a longitudinal direction thereof and a longitudinal direction of said antenna element are substantially parallel to each other, and is allowed to resonate with said antenna element;
   a second resonant antenna element, wherein said antenna element is disposed between and in parallel with said first and second resonant antenna elements.

2. The antenna device of claim 1, wherein said resonant antenna element is parasitic.

3. The antenna device of claim 1, wherein said antenna element is a monopole antenna element.

4. The antenna device of claim 1, wherein said first and second resonant antenna elements are disposed symmetrically with respect to an axis in said longitudinal direction of said antenna element.

5. The antenna device of claim 1, wherein said first and second resonant antenna elements are disposed with centers thereof staggered with respect to a center in said longitudinal direction of said antenna element.

6. An electronic apparatus, comprising:
   a main body chassis containing a keyboard;
   a display chassis containing a display; and
   an antenna device having
      an antenna element to which power is supplied;
      a first resonant antenna element that is disposed such that a longitudinal direction thereof and a longitudinal direction of said antenna element are substantially parallel to each other, and is allowed to resonate with said antenna element; and
      a second resonant antenna element, wherein said antenna element is disposed between and in parallel with said first and second resonant antenna elements.

7. The electronic apparatus of claim 6, wherein said first and second resonant antenna elements are disposed with centers thereof staggered with respect to a center in said longitudinal direction of said antenna element.

8. The electronic apparatus of claim 6, wherein said resonant antenna element is parasitic.

9. The electronic apparatus of claim 6, wherein said antenna element is a monopole antenna element.

10. The electronic apparatus of claim 6, wherein said first and second resonant antenna elements are disposed symmetrically with respect to an axis in said longitudinal direction of said antenna element.

* * * * *